United States Patent
Rupp

(10) Patent No.: US 6,208,617 B1
(45) Date of Patent: Mar. 27, 2001

(54) CHANNEL TRACKING IN A MOBILE RECEIVER

(75) Inventor: Markus Rupp, Lincroft, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/032,425

(22) Filed: Feb. 27, 1998

(51) Int. Cl.[7] .................................................. H04L 27/22
(52) U.S. Cl. .......................... 370/216; 375/326; 375/341; 375/348
(58) Field of Search .................................. 375/316, 324, 375/340, 341, 346, 347, 348, 349; 370/216, 242, 252, 503, 516

(56) References Cited

U.S. PATENT DOCUMENTS

| | | | |
|---|---|---|---|
| 5,204,878 | * | 4/1993 | Larsson .................................. 375/374 |
| 5,303,263 | * | 4/1994 | Shoji et al. ........................... 375/326 |
| 5,602,881 | * | 2/1997 | Shiino et al. ......................... 375/371 |
| 5,684,836 | * | 11/1997 | Nagasu et al. ........................ 375/326 |
| 5,751,776 | * | 5/1998 | Shiino et al. ......................... 375/371 |

OTHER PUBLICATIONS

A. Bahai et al, "A Frequency offset estimation technique for nonstationary channels", Proc. of ICASSP97, pp. 3897–3900, Apr. 1997.

* cited by examiner

Primary Examiner—Ricky Ngo
(74) Attorney, Agent, or Firm—Henry T. Brendzel

(57) ABSTRACT

An effective receiver is achieved for situations where the receiver is mobile, and may be traveling at relatively high speed, and where the receiver's internal demodulation oscillator causes a frequency offset, with processing that shares a common algorithm for both frequency offset and channel characteristics estimations. Specifically, the commonly employed algorithm, such as the LMS algorithm, computes an estimate of the frequency offset, and that very same algorithm is also used to estimate the channel characteristics. When the LMS algorithm is used, a frequency offset estimate can be derived from signals derived in the course of executing the LMS algorithm. A frequency compensation factor is then developed and applied to the incoming signal to create a signal that that not have an appreciable frequency offset. That signal is then applied to a process that also employs the LMS algorithm, in combination with a detection algorithm, such as, for example, the Viterbi algorithm, to recover from the incoming signal the information signals that had been encoded into the incoming signals.

33 Claims, 2 Drawing Sheets

CHANNEL TRACKING IN A MOBILE RECEIVER

BACKGROUND OF THE INVENTION

This invention relates to signal detection and, more particularly, to channel tracking techniques in mobile receivers adapted to receive phase-modulated signals.

One well-known technique for transmitting information to mobile receivers is to convert the signal to digital symbols, to map those symbols onto a two-dimensional space, to modulate a carrier with the mapped symbols, and to transmit the modulated carrier to the receiver. The modulation of a symbol mapped onto a two-dimensional space (having x and y coordinates) takes place by amplitude-modulating the x component of the symbol by a carrier signal, amplitude-modulating the y component of the symbol by the carrier signal shifted by 90 degrees, and adding the two modulation products. In some applications the mapping is restricted to a circle, and that, effectively, results in phase modulation of the carrier.

A mobile unit receives signals that are corrupted by inter-symbol interference (ISI) as well as by thermal noise, and the challenge is to detect the so-distorted symbols. The ISI is a non-stationary process when the mobile unit is moving. That is, the characteristics of the channel are based on the location of the mobile unit relative to the transmitter, and when that location changes, the channel characteristics change. Prior art systems allow for adapting a receiver's response to the channel characteristics, but this adapting requires processing, and the processing requires time. As long as the channel characteristics change slowly, there is no problem. When the channel characteristics change rapidly, such as when the mobile unit changes its location rapidly (e.g. the mobile unit is in a car, or a plane), the currently-used adapting processes are able to keep up with the changes under ideal conditions.

The challenge to track the changing channel characteristics is compounded by the fact that the mobile unit has no information about the precise time when symbols are applied to the transmitter's modulator, and therefore does not know precisely when to sample the received signal. Furthermore, although the receiver nominally knows what the transmitter's carrier frequency is, the actual carrier frequency may be off and, in any event, the receiver's local frequency may be off from its specified value because of normal manufacturing tolerance issues, temperature variations, etc.

When the receiver's local oscillator is not equal to the transmitter's oscillator, an offset in frequency is said to exist. When there is no offset in frequency, the received signal is sampled, converted to digital form, and applied to a detection algorithm. The detection algorithm must remove the ISI introduced by the channel and must also compensate for the changing characteristics of the channel due to the movements of the mobile unit (e.g., in a car moving at 60 miles per hour, the channel characteristics change fairly rapidly). One technique that accomplishes channel tracking is the Least-Mean-Squared (LMS) algorithm. The LMS algorithm, however, is not thought of as being able to handle changing channel characteristics when there is a significant frequency offset.

When the receiver's frequency does have a significant offset, conventional differential detectors can be used to estimate the frequency offset and to compensate therefor. Differential detectors are described, for example, by Proakis in "Digital Communication," McGraw Hill, 1989, Chapter 4.2.6. However, differential detectors fail when the channel characteristics change rapidly.

To overcome the problem of both a frequency offset and a rapidly changing channel, practitioners have included a training word in the symbol sequence, and once the training word is detected and its position is ascertained, the frequency offset can be extracted. An algorithm for accomplishing this, which is quite complex, is presented, for example, by Bahai and Sarraf in "A Frequency Offset Estimation for Nonstationary Channels," *Proc. of ICASSP 97*, pp. 3897–3900, April, 1997.

A simpler solution would obviously be advantageous.

SUMMARY

A simpler solution is, indeed, available where, in accord with the principles disclosed herein, a given algorithm, such as the LMS algorithm, computes an estimate of the frequency offset, and that very same algorithm is also used to estimate the channel characteristics. When the LMS algorithm is used, a frequency offset estimate can be derived from signals derived in the course of executing algorithm. A frequency compensation factor is then developed and applied to the incoming signal to create a signal that does not have an appreciable frequency offset. That signal is then applied to a process that also employs the LMS algorithm, in combination with a detection algorithm, such as, for example, the Viterbi algorithm, to recover from the incoming signal the information signals that had been encoded into the incoming signals. In addition to carrying out the disclosed process during training intervals, the process can be carried out during normal transmission of data.

Thus, in at least one embodiment of this invention, a fairly simple algorithm is employed to estimate the frequency offset. Moreover the algorithm employed for estimating channel characteristics is the very same as the algorithm employed to compensate for frequency offsets. This simplifies the receiver's construction and reduces its cost.

DETAILED DESCRIPTION

Figure 1:
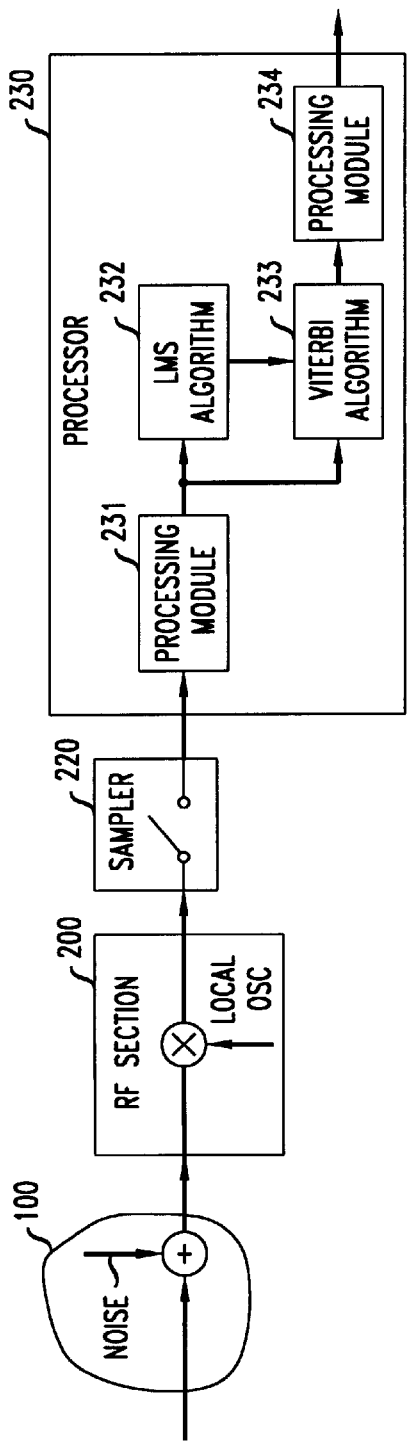
FIG. 1 illustrates some salient elements of a mobile receiver.

FIG. 1 presents a block diagram of various elements of a receiving process, including channel 100 to which symbols modulated onto a carrier are applied. Channel 100 introduces additive noise, and the resulting signal is applied to demodulator 200, which employs local oscillator 210. The demodulated output is sampled and converted to digital form in block 220, and the digital signal is applied to digital processor 230. Processor 230 is shown to include a pre-processing module 231, an LMS algorithm module 232, a Viterbi algorithm module 233, and a post-processing module 234. During a training period processor 230 conventionally employs the LMS algorithm (module 232) to estimate the channel characteristics, and the derived information is employed by a symbol-detection algorithm during the data transmission period to recover the transmitted data. An example of a symbol-detection algorithm is the Viterbi algorithm, depicted in FIG. 1 by module 233.

As also indicated above, the LMS algorithm cannot compensate for rapidly varying channel characteristics in the presence a frequency offset, without additional and fairly complex algorithms. See, for example, the method reported in the aforementioned Bahai et al paper. In accordance with the principles disclosed herein, however, a fairly simple algorithm is employed to estimate the frequency offset. Moreover the algorithm is the same as the algorithm employed for estimating channel. This simplifies the receiver's construction and reduces its cost.

Figure 2:
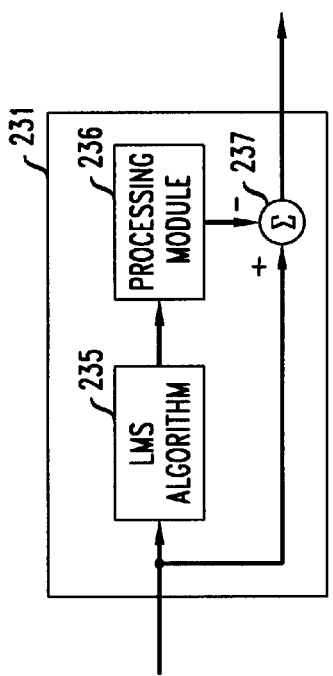
FIG. 2 presents a block diagram of a pre-processing module in accordance with the principles of this invention.

The process carried out by the transmitter/receiver arrangement, in accord with the principles disclosed herein, is one where a training sequence that is known to the receiver is sent by the transmitter, and during that time the LMS algorithm evaluates an estimate of the frequency offset in the manner disclosed below. That is performed in processing module 231. Thereafter, incoming signals (both data and training sequence signals) are compensated by the estimate of the frequency offset (also in processing module 231) and applied to modules 232 and 233. FIG. 2 diagrammatically shows this by depicting module 231 in greater detail. It includes an LMS algorithm module 235 that interacts with processing module 236 to yield an estimate of the frequency offset. That signal is subtracted from the incoming signal in element 237 and applied to modules 232 and 233.

The following develops the characteristics of signals employed to estimate the frequency offset by the use of the LMS algorithm.

The signal received by element 200 at time k, d(k), corresponds to the transmitted sequence of symbols (we assume for now that it is the training sequence), $u_k$, that was first modulated by a carrier (resulting in $u_k e^{j\omega k}$), then convolved with channel $w_o$ to yield $u_k w_o e^{j\omega k}$, and finally augmented with additive noise v'(k). When extracted from its carrier signal, i.e., demodulated, by element 210, and when the receiver's local oscillator is offset from the carrier by frequency $\Omega$, the received signal at time k is $$d(k) = u_k w_o e^{j\Omega k} + v(k). \tag{1}$$

The time response of $w_o$ is time-limited, and when quantized in time, i.e., sampled, the channel response $w_o$ is represented by a vector of order M. Correspondingly, $u_k$ is an M order vector containing the M latest symbols transmitted to the mobile receiver. The term $v(k)=v'(k)e^{j\Omega k}$, and $u_k w_o$ is the dot product of the two component vectors. The first term of equation (1) can be also viewed as the dot product of transmitted symbols vector with a periodically changing channel vector, or as the dot product of the channel with a sequence $u_k$ that includes a modulating offset frequency $e^{j\Omega k}$.

The challenge, then, is to estimate the channel and to estimate the frequency offset. One known approach for estimating a channel that is not changing with time is to recursively derive an improved current estimate of the channel from the immediately previous estimate of the channel, combined with or modified by the newly arrived data. The following equation presents such an estimate at time k+1 based on information at time k, and is typically referred to as the LMS algorithm:

$$w_{k+1} = w_k + \mu(d(k) - u_k w_k) u_k^*. \tag{2}$$

In equation (2), $W_k$ is the channel estimate at time k, $u_k$ is the M order vector at the mobile receiver which, during training, is the $k^{th}$ member of the training sequence.

The channel estimate at time k, $w_k$ might differ from the actual channel response at that time, $w_o e^{j\Omega k}$, resulting in an error vector $\tilde{w}_k$, i.e., $$\tilde{w}_k = w_o e^{j\Omega k} - w_k \tag{3}$$

Combining equations (2) and (3) to express the error vector at time k+1 in terms of values at time k, and taking the expected value thereof yields $$E[\tilde{w}_{k+1}] = (I - \mu R)E[\tilde{w}_k] - w_o e^{j\Omega k}(1 - e^{j\Omega}) \tag{4}$$

where the matrix R is the expectation of the outer dot product of vectors, $u_k^*$ and $u_k$; i.e., $$R = E[u_k^* u_k]. \tag{5}$$

A solution of this recursive equation, in the form $E[\tilde{w}_k] = a e^{j\Omega k}$, leads to $$E[\tilde{w}_k] = \left(I - \frac{\mu}{1 - e^{j\Omega}} R\right)^{-1} w_o e^{j\Omega k}, \tag{6}$$

and to $$E[w_k] = \left(I - \left(I - \frac{\mu}{1 - e^{j\Omega}} R\right)^{-1}\right) w_o e^{j\Omega k}. \tag{7}$$

Combining two successive estimates of the channel in a dot product yields $$E[w_k^*]E[w_{k+1}] = |w_o|^2 \left|1 - \frac{1 - e^{j\Omega}}{1 - \mu - e^{j\Omega}}\right|^{-1} e^{j\Omega} \tag{8}$$

and from equation (8), $e^{j\Omega}$ is derived by dividing the dot product of the two successive channel estimates by its magnitude.

Figure 3:
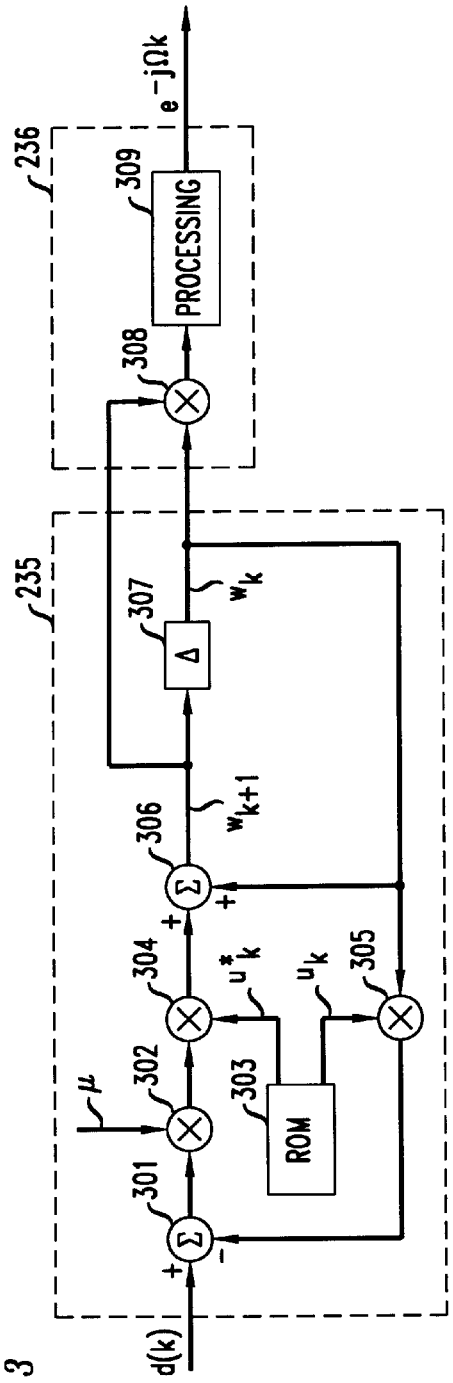
FIG. 3 depicts the processing within processor 231 in accordance with one tracking approach.

FIG. 3 presents a block diagram that discloses, in conformance with the above analysis, the process carried out in processor modules 235 and 236. In FIG. 3 the received sample, is applied to subtracter 301 where the dot product signal $u_k w_k$ is subtracted. The difference signal is applied to multiplier 302 where the signal is multiplied by the step size, $\mu$, and thereafter to multiplier 304 where the signal is multiplied by the complex conjugate of the training sequence, $u_k^*$, derived from ROM 303. The result is added to signal $w_k$ in adder 306, yielding the channel estimate at time k+1; i.e., $w_{k+1}$. The computed $w_{k+1}$ is applied to a one-unit delay element 307. At the time $w_{k+1}$ is inserted into delay element 307, the delay element outputs signal $w_k$, and that signal is applied to adder 306 and to dot product multiplier 305. The other input to dot product multiplier 305 is derived from ROM 303 which contains the training sequence. The product signal developed by multiplier 305 is $u_k w_k$, which is applied to subtracter 301. This completes the elements that LMS algorithm includes.

To develop the frequency estimate in accordance with equation (8), the $w_k$ and $w_{k+1}$ signals at the output and input of delay element 307, respectively, are applied to processing module 236 wherein they are combined in a dot product multiplier 306 and applied to processing module 309. Module 309 divides its input signal by the signal's magnitude to obtain the phasor $e^{-j\Omega}$, and that phasor is rotated by the index k and applied to element 237 which multiplies the incoming signal by the frequency offset compensation factor $e^{-j\Omega k}$. The output of multiplier 237 is applied to modules 232 and 233.

A second, even simpler, process is given by evaluating an estimate of the angle of $$d^*(k)(u_k w_k), \tag{11}$$

where d*(k) is the complex conjugate of the received signal. The expectation of $d^*(k)(u_k w_k)$ is $$e[d^*(k)(u_k w_k)] = |w_0 u_k|^2 \left(1 - \frac{1 - e^{j\Omega}}{1 - \mu - e^{j\Omega}}\right), \quad (12)$$

and, for small values of $\Omega$ and not too small values of $\mu$, the angle of this expectation can be approximated by $$\Omega/\mu \quad (13)$$

Figure 4:
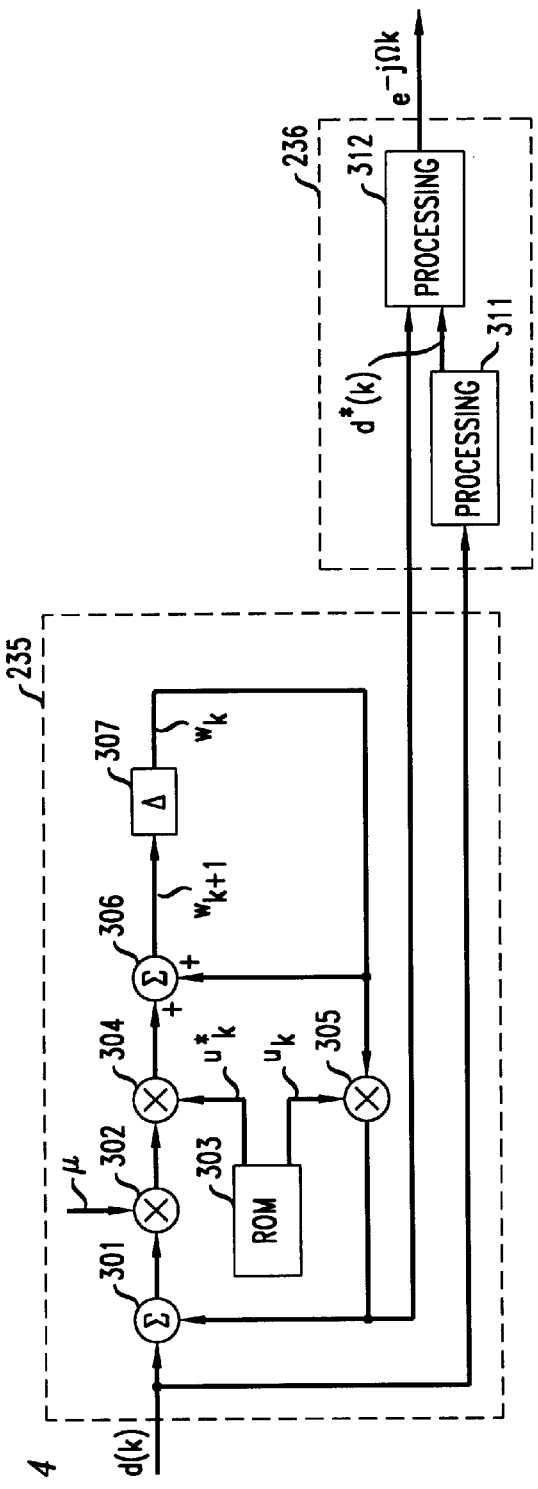
FIG. 4 depicts the processing within processor 231 in accordance with another tracking approach.

Once $\Omega$ is known, $e^{j\Omega}$ can be evaluated and multiplied by the index k to derive the offset frequency compensation factor, $e^{-j\Omega k}$. This is illustrated in FIG. 4 where module 235 is identical to that of FIG. 3, but the output that is extracted from module 235 is the incoming signal, d(k), and the dot product signal $u_k w_k$ of multiplier 305. These signals are applied to processing module 236 where the complex conjugate signal d*(k) is computed by processing module 311. The output of module 236 is combined with $u_k w_k$ in processing module 312 to derive $e^{-j\Omega k}$ (by multiplying the product of d*(k) and $u_k w_k$ by the step size, $\mu$, and the index k, and finally, rotating the phasor $e^{-j}$ by the result of the multiplication).

It should be understood that the processes disclosed above are the processes that are particularly relevant to the disclosed invention and that a receiver incorporating the principles disclosed herein will have other controls and processes that are not described herein. For example, the receiver would have a process for determining when the training sequence is being received. Such a process may reside within processing module 231, or it may be in some other processing module that is not shown in FIG. 1 (because does not form a part of the advance in the art that is disclosed herein).

Also, the above-disclosed processes are described in connection with operations during training sequences, but that is not a limitation of this invention. Use of the training sequence in the above disclosure was deemed proper to make the algorithm clearer, because during the training sequence the receiver knows what to expect. However, it should be realized that the disclosed processes are equally valid for real data signal. Instead of using $u_k$ and $u_k^*$ signals from ROM 303, one can use the signal developed by modules 233 and 234. The reason that these non-training signals can be used is because most of the estimated signals are correct and are, therefore, as goos as the training symbols. In fact, there are many more estimated data signals than training signals and, therefore, using the real data symbols as well as the training symbols gives a more accurate estimate in a shorter time.

Lastly, the above-disclosed processes are generally shown to be carried out in processor 230, and this processor may be part of a special purpose hardware implementation, or it may be realized with a conventional microprocessor operating under stored program control. The specific software that needs to be created is very straight forward given the functional description contained herein, and is, therefore, not described in further detail. Of course, a processor 230 that is implemented with special purpose integrated ICs will, more likely than not, attempt to take advantage of the fact that the frequency offset estimate and the channel characteristics estimates are carried out with the help of a given algorithm (in the case illustrated above, the LMS algorithm). That is, it is likely that a manufacturer would have an LMS IC, and use that IC once for frequency offset estimation, and another time for the channel characteristics estimation. Alternatively, a single IC can be designed that may be time-shared for both purposes.

It should be apparent that the foregoing disclosed the principles of this invention, and that various other embodiments are possible, as well as modifications to the presented illustrative embodiment, without departing from the spirit and scope of this invention.

I claim:

1. A method for recovering from a corrupting channel an incoming signal that comprises a carrier that has been phase modulated with information signals, the method comprising the steps of:
   demodulating within a receiver said incoming signal with a local oscillator that is close in frequency to the frequency of the carrier signal, thereby creating a signal with an offset frequency that corresponds to the difference between the frequency of said carrier and the frequency of said local oscillator;
   estimating said offset frequency with a particular algorithm performed upon said incoming signal, developing thereby an offset frequency estimate;
   estimating characteristics of said channel using said particular algorithm, developing thereby a channel estimate; and
   recovering said information signals by processing said incoming signal with said offset frequency estimate and with said channel estimate.

2. The method of claim 1 where said particular algorithm is the LMS algorithm.

3. The method of claim 1 wherein said step of estimating characteristics of said channel is effected by carrying out said particular algorithm on said incoming signals modified by said offset frequency estimate.

4. The method of claim 3 wherein said step of recovering operates on said incoming signals modified by said offset frequency.

5. The method of claim 3 wherein said step of estimating channel characteristics and said step of recovering operate on said incoming signals modified by said offset frequency.

6. The method of claim 5 where said incoming signals modified by said offset frequency correspond to said incoming signals multiplied by a phasor having a phase that is related to said offset frequency estimate.

7. The method of claim 5 where said incoming signals modified by said offset frequency correspond to said incoming signals demodulated by offset frequency estimate.

8. The method of claim 1 wherein said step of estimating said offset frequency includes a step of post processing output signals developed by said selected algorithm to arrive at said frequency estimate.

9. The method of claim 8 wherein, responsive to a sequence of incoming signals, $\{d(0), d(1), d(3), \ldots d(k)\}$, said particular algorithm develops a channel estimates $w_k$ and $w_{k+1}$, and the post processing employs said $w_k$ and $w_{k+1}$ channel estimates, where $w_k$ is an M order vector estimating the channel at time k, M being an integer.

10. The method of claim 9 wherein said post processing comprises forming a dot product of said $w_k$ and $w_{k+1}$ channel estimates.

11. The method of claim 10 wherein said step of post processing further comprises dividing the dot product of said $w_k$ and $w_{k+1}$ channel estimates by its magnitude, to form thereby a phasor $e^{j\Omega}$.

12. The method of claim 9 wherein said $w_k$ and $w_{k+1}$ channel estimates are developed via the equation $$w_{k+1} = w_k + \mu(d(k) - u_k w_k) u_k^*$$

where $\mu$ is a selected constant, $u_k$ corresponds to a training sequence (vector) known to said receiver ($\{u(0), u(1), u(2), \ldots u(k)\}$), $u_k^*$ is the complex conjugate of $u_k$, and $u_k w_k$ represents the dot product of the component vectors.

13. The method of claim 9 wherein said $w_k$ and $w_{k+1}$ channel estimates are developed via the equation $$w_{k+1} = w_k + \mu(d(k) - u_k w_k)u_k^*$$

where $\mu$ is a selected constant, $u_k$ corresponds to a previously decoded sequence (vector) of symbols ($\{u(0), u(1), u(2), \ldots u(k)\}$), $u_k^*$ is the complex conjugate of $u_k$, and $u_k w_k$ represents the dot product of the component vectors.

14. The method of claim 9 wherein said $w_k$ and $w_{k+1}$ channel estimates are developed via the equation $$w_{k+1} = w_k + \mu(d(k) - u_k w_k)u_k^*$$

where $\mu$ is a selected constant, $u_k$ corresponds to a collection of previously decoded sequence (vector) of symbols and a known training sequence ($\{u(0), u(1), u(2), \ldots u(k)\}$), $u_k^*$ is the complex conjugate of $u_k$, and $u_k w_k$ represents the dot product of the component vectors.

15. The method of claim 9 wherein said post processing comprises forming the product $d^*(k)(u_k w_k)$, where $d^*(k)$ is the complex conjugate of $d(k)$, determining the phase of the last-mentioned product, setting the determined phase to $\Omega/\mu$ where $\mu$ is a selected constant, and forming a phasor $e^{j\Omega}$.

16. The method of claim 1 wherein said steps of estimating are carried out when said incoming signals contain a training sequence.

17. The method of claim 16 wherein said training sequence is known to said receiver a priori.

18. The method of claim 1 wherein said steps of estimating are carried out when said incoming signals contain a training sequence that is known a priori to the receiver, as well as when said incoming signals data symbols.

19. In a method carried out in a receiver where an incoming signal is demodulated with a local oscillator that is close in frequency to the frequency of the carrier signal, where a channel characteristics estimate is developed in accordance with a given algorithm in response to an output signal of the demodulator, and where a detector is responsive to the output signal of the demodulator that is modified in accordance with said channel characteristics, the improvement comprises the steps of:

developing an offset frequency estimate by carrying out said given algorithm on said incoming signal;

modifying said output signal of said demodulator with said offset frequency estimate, and developing said channel characteristics estimate from said output signal of the demodulator, as modified by said step of modifying.

20. The method of claim 19 where said incoming signal contains a training sequence.

21. The method of claim 19 that is carried out when said incoming signal contains a training sequence.

22. A method carried out in a receiver for recovering from a corrupting channel an incoming signal that comprises a carrier that has been phase modulated with information signals, which incoming signal was demodulated with a local oscillator that is close in frequency to the frequency of the carrier signal, thereby creating a signal that is modulated with a frequency corresponding to the difference between the frequency of said carrier and the frequency of said local oscillator, said method comprising the steps of:

developing an offset frequency estimate with a particular algorithm performed upon said incoming signal;

developing a channel characteristics estimate using said particular algorithm; and recovering said information signals by processing said incoming signal with said offset frequency estimate and with said channel characteristics estimate.

23. The method of claim 22 where the information signals are known a priori.

24. The method of claim 22 where the information signals correspond to a training sequence.

25. The method of claim 22 where the information signals comprise both a training sequence and non-training signals.

26. A receiver adapted for use in a mobile environment which includes a receiver front end for receiving a phase modulated carrier signal, a demodulator responsive to the received signal that employs a local oscillator which is offset in frequency from the frequency of the carrier signal, and a processor responsive to the output signal of said demodulator for estimating characteristics of a channel through which the signal applied to said receiver front end has passed, which processor employs a given algorithm, the improvement in said receiver comprising:

a frequency offset processor interposed between said demodulator and said processor for estimating in said receiver characteristics of said channel, said frequency offset processor employing said given algorithm to correct for said offset in frequency; and a detector coupled to said frequency offset processor and to said processor for estimating characteristics of said channel.

27. The receiver of claim 26 where the detector comprises a Viterbi algorithm module.

28. The receiver of claim 26 wherein said given algorithm is an LMS algorithm.

29. The receiver of claim 26 wherein said processor for estimating characteristics of a channel and said processor for estimating said frequency offset are the same processor that is time-shared to serve as said processor for estimating characteristics of said channel and said processor for estimating said frequency offset.

30. The receiver of claim 29 wherein said given algorithm is an LMS algorithm and said processor that is time-shared includes an integrated circuit that carries out the LMS algorithm.

31. The receiver of claim 26 wherein said processor for estimating a channel and said processor for estimating said frequency offset each employ an integrated circuit that carries out said given algorithm.

32. A receiver adapted for use in a mobile environment which includes a receiver front end for receiving a phase modulated carrier signal, a demodulator responsive to the received signal that employs a local oscillator which is offset in frequency from the frequency of the carrier signal, and a processor responsive to the output signal of said demodulator for estimating characteristics of a channel through which the signal applied to said receiver front end has passed, which processor employs a given algorithm, the improvement in said receiver comprising:

first means, interposed between said demodulator and said processor for developing a measure of said offset in frequency by performing said given algorithm upon an output signal of said demodulator, and for developing a frequency-compensated signal based on said developed measure; and second means, responsive to said first means and to said processor, for detecting a signal that modulated said phase modulated signal.

33. A receiver adapted for use in a mobile environment which includes a receiver front end for receiving a phase modulated carrier signal, a demodulator responsive to the received signal that employs a local oscillator which is offset in frequency from the frequency of the carrier signal, a processor responsive to the output signal of said demodulator for estimating characteristics of a channel through which the signal applied to said receiver front end has passed, which processor employs a given algorithm, and a detector responsive to said processor and to said output signal of said demodulator, the improvement in said receiver comprising:

means, interposed between said demodulator and said processor for developing a measure of said offset in frequency by performing said given algorithm upon an output signal of said demodulator, and for developing a frequency-compensated signal based on said developed measure.

* * * * *